(12) United States Patent
Li et al.

(10) Patent No.: US 11,310,125 B2
(45) Date of Patent: Apr. 19, 2022

(54) AI-ENABLED ADAPTIVE TCA THRESHOLDING FOR SLA ASSURANCE

(71) Applicant: AT&T Intellectual Property I, L.P., Atlanta, GA (US)

(72) Inventors: Wen-Jui Li, Bridgewater, NJ (US); Tsong-Ho Wu, Englishtown, NJ (US); Jun-Min Liu, Holmdel, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 190 days.

(21) Appl. No.: 15/989,760

(22) Filed: May 25, 2018

(65) Prior Publication Data

US 2019/0363950 A1   Nov. 28, 2019

(51) Int. Cl.
*H04L 12/24* (2006.01)
*H04L 41/5019* (2022.01)
*H04L 41/0681* (2022.01)
*H04L 41/5009* (2022.01)
*H04L 41/16* (2022.01)
*H04L 41/14* (2022.01)

(52) U.S. Cl.
CPC ...... *H04L 41/5019* (2013.01); *H04L 41/0681* (2013.01); *H04L 41/14* (2013.01); *H04L 41/16* (2013.01); *H04L 41/5016* (2013.01)

(58) Field of Classification Search
CPC ... H04L 41/147; H04L 43/16; H04L 41/5019; H04L 47/822; H04L 47/745; H04L 41/5009; H04L 41/16; H04L 43/08; H04L 41/0631; H04L 47/823; H04L 41/0681; H04L 41/5016; H04L 41/14; G06F 11/3452; G06F 11/3466; G06F 11/0754; G06F 2201/81; G06F 2201/875

See application file for complete search history.

(56) References Cited

U.S. PATENT DOCUMENTS

| 5,699,348 A | 12/1997 | Baidon et al. |
| 7,430,598 B2 | 9/2008 | Raden et al. |
| 7,567,942 B2 | 7/2009 | Kandregula et al. |
| 7,760,643 B2 | 7/2010 | Kim et al. |

(Continued)

FOREIGN PATENT DOCUMENTS

| WO | WO 2000/019664 A2 | 4/2000 |
| WO | WO 2017/122173 A1 | 7/2017 |
| WO | WO 2018/009546 A1 | 1/2018 |

OTHER PUBLICATIONS

Wuhib et al.; "Decentralized Computation of Threshold Crossing Alerts"; Int'l Workshop on Distributed Systems: Operations and Management; 2005; p. 220-232.

(Continued)

*Primary Examiner* — Kevin T Bates
*Assistant Examiner* — Ranjan Pant
(74) *Attorney, Agent, or Firm* — Guntin & Gust, PLC; Dana Lemoine

(57) ABSTRACT

Systems and methods for adaptive TCA threshold management are described. A technique can include receiving threshold crossing alert (TCA) data including operational TCA data, determining a TCA prediction trigger based on a current threshold, matching, in response to determining the TCA prediction trigger, the operational TCA data to a pattern from a TCA pattern bank, and calculating a predicted TCA threshold based on the pattern.

20 Claims, 9 Drawing Sheets

(56) References Cited

U.S. PATENT DOCUMENTS

| | | | |
|---|---|---|---|
| 8,001,527 B1* | 8/2011 | Qureshi | G06F 11/079 |
| | | | 717/120 |
| 8,086,708 B2 | 12/2011 | Breitgand et al. | |
| 8,170,417 B2 | 5/2012 | Liu et al. | |
| 8,374,102 B2 | 2/2013 | Luft et al. | |
| 8,458,530 B2 | 6/2013 | Kini et al. | |
| 8,732,534 B2 | 5/2014 | Kini et al. | |
| 8,755,499 B2 | 6/2014 | Kung et al. | |
| 8,804,575 B2 | 8/2014 | Kumar et al. | |
| 9,356,883 B1 | 5/2016 | Borthakur | |
| 9,600,394 B2 | 3/2017 | Salunke et al. | |
| 9,813,314 B2 | 11/2017 | Vasseur et al. | |
| 9,853,882 B2 | 12/2017 | Vasseur et al. | |
| 9,918,258 B2 | 3/2018 | Ehrlich et al. | |
| 2003/0079160 A1* | 4/2003 | McGee | G06F 11/0709 |
| | | | 714/39 |
| 2006/0276995 A1* | 12/2006 | Breitgand | H04L 41/00 |
| | | | 702/179 |
| 2010/0052924 A1* | 3/2010 | Bajpay | H04L 41/0631 |
| | | | 340/635 |
| 2016/0105364 A1 | 4/2016 | Kanonakis et al. | |
| 2017/0019302 A1 | 1/2017 | Lapiotis et al. | |
| 2018/0035898 A1 | 2/2018 | Gunderson | |
| 2018/0041409 A1* | 2/2018 | Vasseur | H04L 43/062 |
| 2019/0102717 A1* | 4/2019 | Wu | G06Q 10/06375 |

OTHER PUBLICATIONS

Wuhib et al.; "A Gossiping Protocol for Detecting Global Threshold Crossings"; IEEE Transactions on Network and Service Management; vol. 7 No. 1; Mar. 2010; 16 pages.

Wuhib et al.; "Decentralized Detection of Global Threshold Crossings Using Aggregation Trees"; Computer Networks 52.9; Feb. 2008; 17 pages.

Chieng et al.; "SLA Brokering and Bandwidth Reservation Negotiation Schemes for QoS-aware Internet"; IEEE Transactions on Network and Service Management; Nov. 2005; 10 pages.

Diallo et al.; "Utility-based Approach for Video Service Delivery Optimization"; Int'l Conf. on Systems and Network Communication; 2014; p. 5-10.

* cited by examiner ations.

AI-ENABLED ADAPTIVE TCA THRESHOLDING FOR SLA ASSURANCE

TECHNICAL FIELD

Aspects herein generally concern performance monitoring in cloud-based SDN networks, and more particularly relate to self-learning adaptive thresholding models, systems, and methodologies for predicting the resource capacity scaling and limiting or preventing impact to a level of service agreement.

BACKGROUND

Service Level Agreement (SLA) management is critical for carriers to meet customer expectations and experiences. SLA metric measuring methods are defined in, e.g., International Telecommunication Union standardization sector (ITU-T) (e.g., ITU-T Y.1540 or ITU-T Y.1541). SLA is violated if at least one SLA performance metric reaches a designated threshold value. In conventional systems, if a SLA violation is detected, the operation takes reactive actions to repair customer services with a penalty to service providers as specified in the SLA.

To provide SLA assurance (e.g., comply with the agreed service level), thereby avoiding reactive labor burdens and penalties, tasks must be prioritized and resources allocated to alleviate potential service impact situations. In a "cloud" software-defined networking environment, capacity is one key factor contributing to SLA impacts, where capability resources includes computing, storage and networking in cloud infrastructure and software defined networking (SDN) environments. Part of monitoring for SLA compliance involves bringing attention to activity which causes SLA performance metrics to approach thresholds (e.g., failing to provide agreed service or exceeding resource commitments). In such instance, threshold crossing alarms (TCAs) may be triggered, which may cause network operators to lock resources until the TCAs are cleared. Accordingly, it enhances network performance to set performance thresholds at appropriate levels given the operating condition of the network. Therefore, the present disclosure provides systems and methods for adaptive TCA thresholding.

SUMMARY

In an example, a method may comprise receiving threshold crossing alert (TCA) data including operational TCA data, determining a TCA prediction trigger based on a current threshold, matching, in response to determining the TCA prediction trigger, the operational TCA data to a pattern from a TCA pattern bank, and calculating a predicted TCA threshold based on the pattern from the TCA pattern bank.

In another example, a system may comprise a TCA data monitor configured to receive threshold crossing alert (TCA) data including operational TCA data, a TCA trigger component configured to determine a TCA prediction trigger based on a current threshold, a TCA pattern matcher configured to match, in response to determining the TCA prediction trigger, the operational TCA data to a pattern from a TCA pattern bank, and a TCA threshold predictor configured to calculate a predicted TCA threshold based on the pattern from the TCA pattern bank.

In another example, a system may comprise a non-transitory computer-readable medium. The non-transitory computer-readable medium may store instructions that when executed a processor perform aspects comprising receiving threshold crossing alert (TCA) data including operational TCA data, determining a TCA prediction trigger based on a current threshold, matching, in response to determining the TCA prediction trigger, the operational TCA data to a pattern from a TCA pattern bank, and calculating a predicted TCA threshold based on the pattern from the TCA pattern bank.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Figure 1:
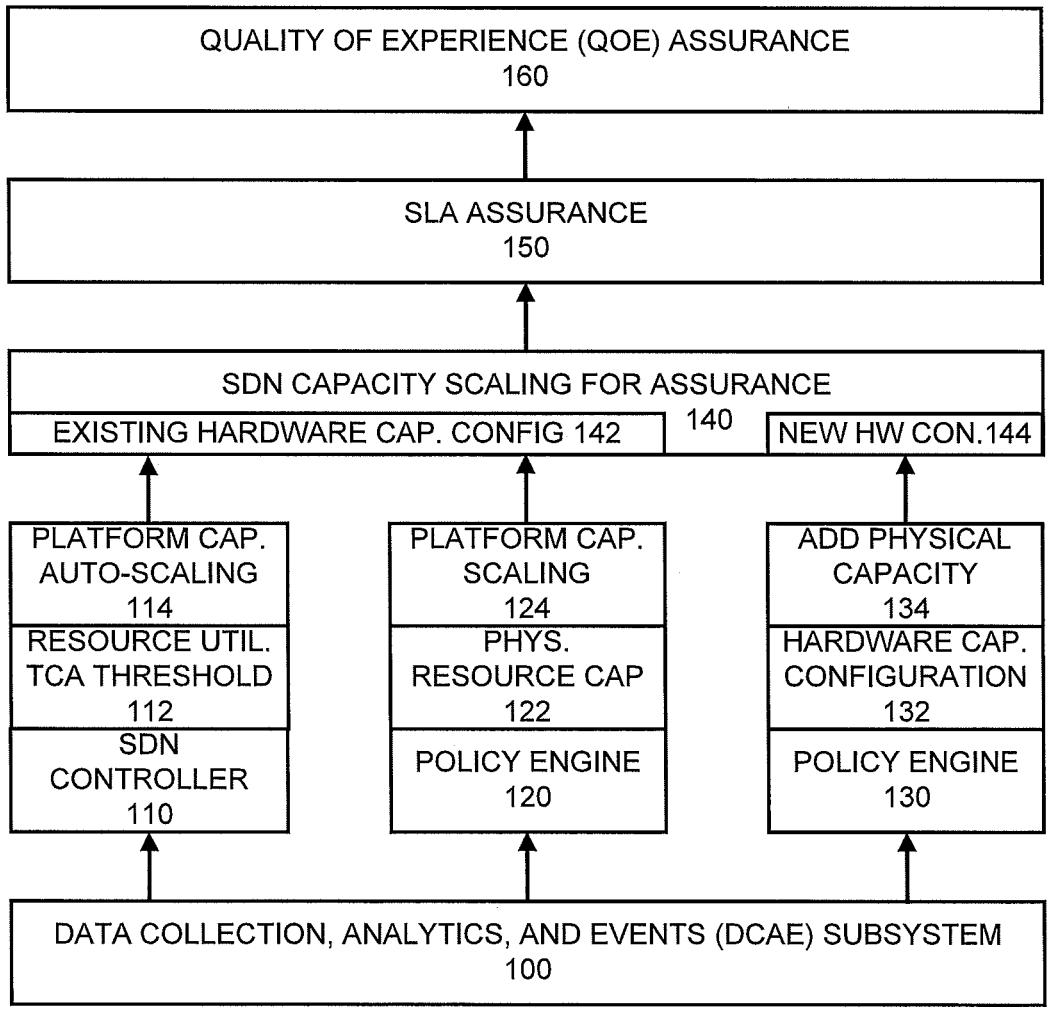
FIG. 1 illustrates an example architecture for implementing resource capacity scaling aspects disclosed herein.

Monitoring potential service or SLA impacts is critical in networks, including SDN networks, to ensure customer experience and satisfaction and allow for proactive network management. Factors contributing to SLA assurance include management of capacity and resources including computing, storage, and networking in the cloud infrastructure of SDN networks. The performance of the network depends on appropriate thresholds being set to ensure appropriate (which can, but need not be, optimal) capacity utilization.

TCAs are triggered when a threshold is crossed relating to SLA or resource utilization. Current threshold data is static and fails to account for the dynamic nature of network traffic loads. Existing thresholds used in conjunction with TCAs are generally manually adjusted by trial-and-error, and suffer from inaccuracies especially in new and developing network environments that are not yet well understood by administrators. Networks performance can be improved by developing thresholds that more accurately reflect true operational performance and requirements.

According, disclosed herein are learning, adaptive capacity resource TCA thresholding architectures and processes for an intelligent monitoring used in conjunction with a control systems that can modify the capacity source TCA thresholds to adapt to SDN dynamic traffic conditions for elastic resource management to reduce SLA impacts. By avoiding "hard-coded" thresholds or thresholds that must be actively managed by an administrator in conjunction with reactive and imperfect management decisions, network resource allocation and SLA monitoring can adapt to dynamic traffic conditions for elastic resource management, thereby reducing service issues or SLA impacts. More, thresholds can change (or more easily change) when resource capacity changes, avoiding false positives if resource capacity increases and ensuring accurate feedback if resource capacity decreases.

Adaptive TCA thresholding as disclosed herein enables adaptation of TCA threshold designation to current context conditions such as traffic load or network impacts to reduce SLA impacts over time in a dynamic manner through SLA Key Performance Indicator (KPI) performance measures. Adaptive thresholding may assign new TCA capacity resource threshold values or adjust existing values of more time and resource management policies based on traffic load and TCA alarm patterns in an automated manner without either user intervention or use of an operations-intervened technique. Adaptive TCA thresholds may be used to update the baseline threshold values at specific time periods (e.g., every 12, 24, or 36 hours, 4 times a day, every 60 minutes, or any other period). Machine learning can be utilized to analyze historical data to locate patterns used in predicting new operational outcomes and continuously analyze data to automate trial-and-error procedures for thresholding.

In an example embodiment of a disclosed solution, TCA data is analyzed in historical and operational datasets. A measured period of 24 hours can be set (e.g., a timeline with sufficient data to smooth operational instability, and periods can be modeled as normal distributions. Monitoring proceeds until the disclosed adaptive TCA thresholding process is triggered by an SLA impact caused by a TCA thresholding value which can be assessed through analysis of resource TCAs. Operational data during triggering is matched to patterns from a pattern bank which contains identified resource utilization patterns (which may be normalized from previous datasets). Based on the match, a new or modified threshold can be predicted. Mean and standard deviation for TCA device resource utilization threshold setting can be derived from these patterns for current and/or predicted conditions for predictive purposes. Based on matched patterns and patterns relating thereto in the pattern bank, new TCA threshold values can be computed, or existing TCA threshold values adjusted. A resolution report can be generated based on this prediction, or the TCA threshold values can be adjusted by implementing the prediction using various control components.

As used herein, an "SLA impact" is an event violating SLA terms. This can include a "hard impact," or penalized event as described in a customer service agreement, or a "soft impact," a predicted issue with the potential to impact SLA requiring attention or resources to avoid "hard impact." SLA impacts can be identified as a result of, e.g., end-to-end delay, insufficient throughput, excessive packet loss, et cetera. Key Performance Indicators (KPIs) and/or Quality of Service (QoS) metrics, which may or may not cause SLA impacts at various measured levels, include packet loss, latency, delay variation, failure to provide guaranteed bitrate, et cetera.

As used herein, "TCA data" includes any data relating to a TCA threshold, or that influences a variable concerning a TCA threshold. TCA data can include SLA impact counts, resource utilization, or other variables. TCA data can be historical or operational. Historical TCA data includes records of past performance, and may include all performance data (which is after observation forwarded to a store such as a historical TCA data database). Operational TCA data involves data from recent, relatively short monitoring periods. The length of time that operational data is treated as such (e.g., before becoming identified as historical data but not operational data) can vary. In embodiments, where the data is stored and the processing occurring can be utilized in the distinction. Moreover, operational TCA data can be identified depending on lengths of time required to smooth anomalies or develop a statistically relevant dataset that allows for trend and pattern recognition. In embodiments, operational data TCA data can be an arbitrary fixed or variable rolling period (e.g., 5-15 minutes) which "drops" the oldest data from that period to the historical data store as new data is observed (e.g., first unit of time in is first unit of time out as last or most recent unit of time in is observed). TCA data can include SLA monitoring or impact counts, KPIs or QoS metrics, resource utilization and/or capacity, network traffic patterns (which can be generalized or specific to individual devices or groups of devices), et cetera. Operational TCA data is current TCA data or TCA data within a period being analyzed (which can be observed on a rolling basis or stop and start with discrete periods, e.g., 8 hours, 24 hours, et cetera). Historical TCA data is past TCA data from which can be used to define patterns and/or neighbors but which does not necessarily represent a current or recent state of some or all of a network. TCAs herein are discussed in terms of one or both of SLA impact TCAs and resource utilization TCAs. TCA(SLA) denotes one or more threshold crossing alarms which are raised based on SLA impact(s) and TCA(R) denotes one or more threshold crossing alarms which are raised based on resource utilization (e.g., compute, storage, network) exceeding a threshold (for a particular use or throughout an entire network) in a cloud SDN infrastructure (e.g., cloud orchestrator, SDN controller, network) being monitored. TCA(R) may be based on total resource commitment, or resource utilization as the ratio of traffic load to capacity.

FIG. 1 illustrates an example environment in which aspects disclosed are implemented. Data Collection, Analytics, and Events (DCAE) subsystem 100 may be a portion of a cloud architecture, such as the AT&T Enhanced Control, Orchestration, Management & Policy (ECOMP) architecture or others. DCAE subsystem 100 can work, in this architecture, with one or more policy engines, orchestrators, software defined network (SDN) controllers, and internet protocol (IP) networks.

DCAE subsystem 100 is organized (as illustrated from left-to-right) according to response times for changes. SDN controller 110, resource utilization TCA threshold 112, and platform capacity auto-scaling 114 (at left) represent real-time or near-real-time (self-service) capacity scaling aspects. Platform capacity auto-scaling 114 can provide for, e.g., live migration or fail-over of VMs or containers. Policy engine 120, physical resource capacity 122, and platform capacity scaling 124 (at middle) generally concerns horizons from multiple hours to a day or more. Platform capacity scaling can provide for, e.g., adjusting resource utilization TCA thresholds. At least portions of this disclosure are concerned with this middle vertical. Policy engine 130, hardware capacity configuration 132, and additional physical capacity 134 (e.g., that which can be added) (at right) are lengthier processes requiring more substantial changes frequently assessed in days or weeks. As shown in SDN capacity scaling for assurance 140, existing hardware capacity configuration 142 is leveraged for events relating to shorter timelines, while new hardware configurations are identified for longer horizons. SDN capacity scaling for assurance supports SLA assurance 150, which in turn supports Quality of Experience (QoE) assurance 160.

Figure 2:
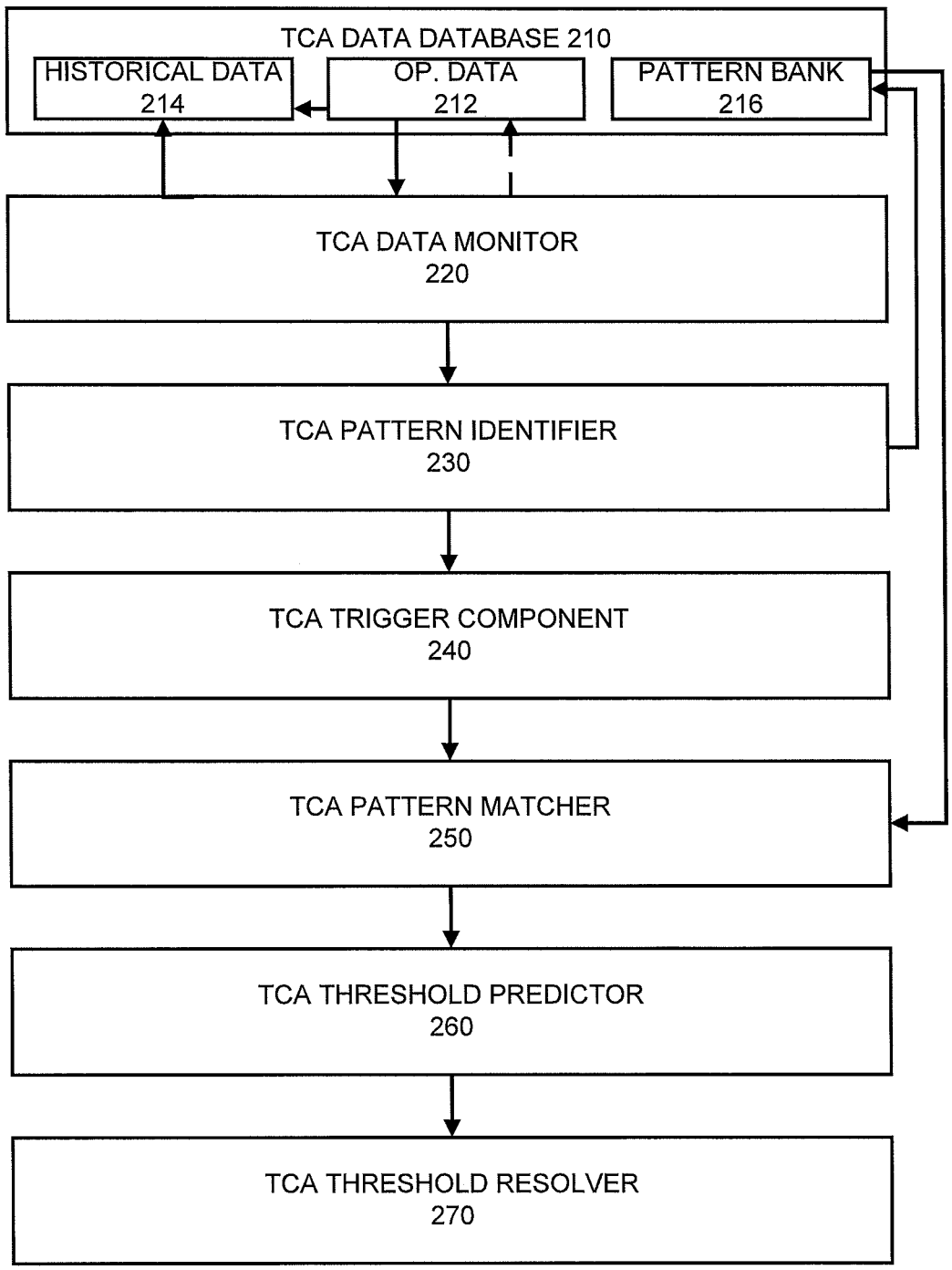
FIG. 2 illustrates an example self-learning system for adaptively modifying thresholds disclosed herein.

FIG. 2 illustrates an example system 200 for performing aspects disclosed herein. System 200 includes TCA data database 210, TCA data monitor 220, TCA pattern identifier 230, TCA trigger component 240, TCA pattern matcher 250, TCA threshold predictor 260, and TCA threshold resolver 270. These components are configured to facilitate adaptive prediction of TCA thresholds as described herein.

TCA data database 210 includes operational data 212 and historical data 214. In embodiments, at least historical data 214 is previously stored or developed. Operational data 212 may be received from another element, or may be monitored by TCA data monitor 220. TCA data monitor 220 can be, or operate with, e.g., a cloud orchestrator, SDN controller, and/or network. Over time, operational data 212 may become historical data 214 and may be stored with other historical data as the operational state changes over time. TCA data database 210 can also include pattern bank 216. In alternative or complementary embodiments, some or all of pattern bank 216 can be stored in a different database than historical and/or operational TCA data.

TCA data monitor 220 monitors TCA data in support of other elements. TCA pattern identifier 230 analyzes data received or observed by TCA data monitor 220 to identify patterns and groups of patterns in TCA data. TCA pattern identifier 230 can store identified patterns in pattern bank 216 or other locations. TCA data handled by TCA data monitor 220 is also utilized by TCA trigger component 240 to determine whether adaptive TCA thresholding is triggered. When adaptive TCA thresholding is triggered, a TCA prediction trigger can be determined, engaging system 200 to continue the adaptive thresholding process. If no TCA prediction trigger is determined, monitoring can continue with thresholds remaining at their current values (which may be static or dynamic depending on the arrangement).

If adaptive TCA thresholding is triggered, a TCA prediction trigger can command for TCA pattern matcher 250 to match patterns in the operational TCA data to patterns from pattern bank 216. Based on these matched patterns, a predicted or future TCA threshold can be calculated using TCA threshold predictor 260. TCA threshold resolver 270 can implement or effect the predicted TCA threshold after its prediction by TCA threshold predictor 260.

While system 200 illustrates a number of components, as will be understood through other portions of the disclosure, a system performing aspects disclosed herein may include only a portion of those illustrated (e.g., excluding TCA data database 210, TCA pattern identifier 230, TCA threshold resolver, et cetera) without departing from the scope or spirit of the innovation.

Figure 3:
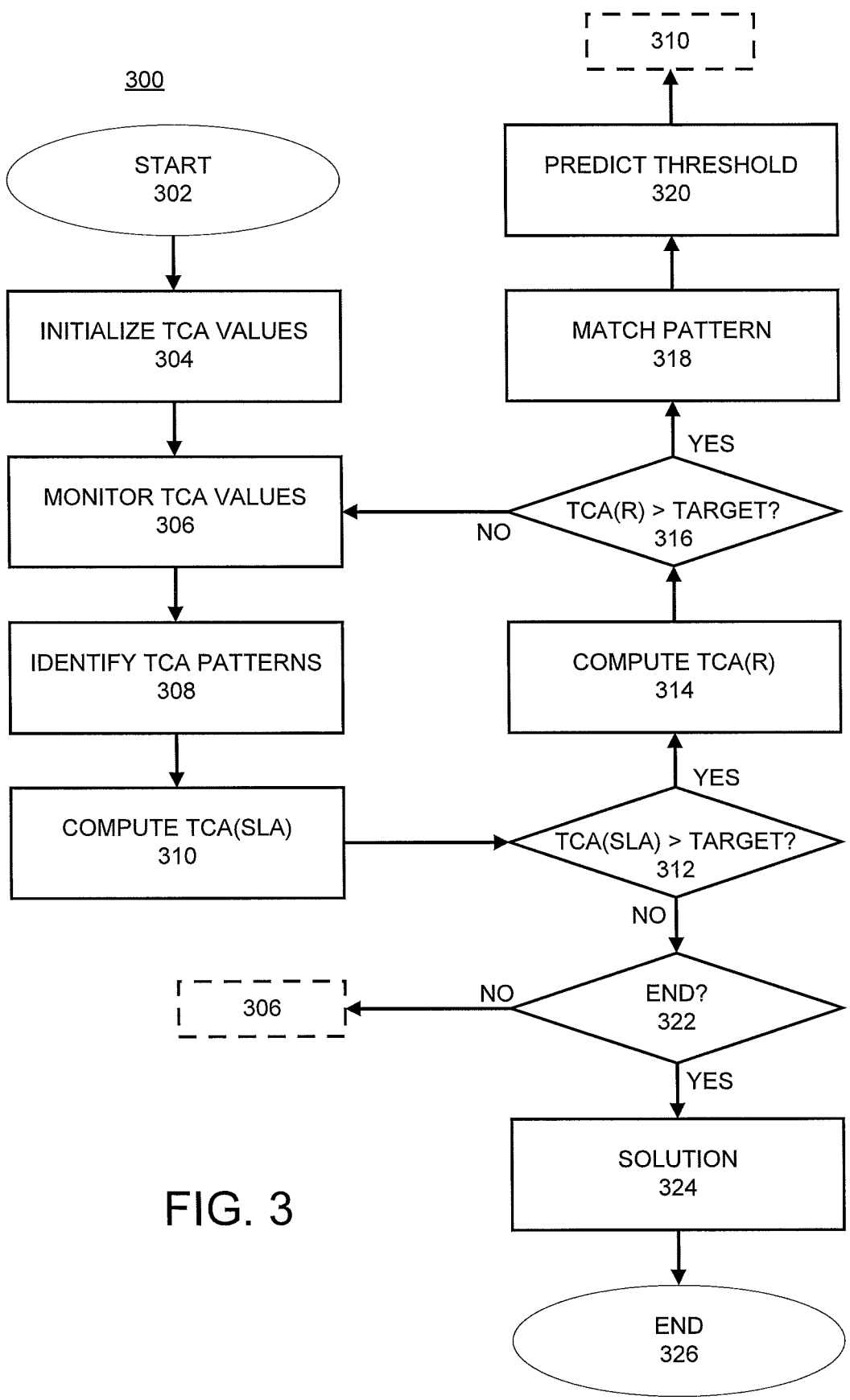
FIG. 3 illustrates an example self-learning method flow for adaptively modifying thresholds disclosed herein.

FIG. 3 illustrates a methodology 300 for adaptively predicting a TCA threshold as disclosed herein. Methodology 300 begins at 302 and proceeds to 304 where TCA data values are initialized. Initializing TCA values may include observing operational TCA data, or receiving and/or observing operational and/or historical TCA data. This can include, but is not limited to, retrieving the TCA data from a TCA database which can contain historical TCA data, and/or monitoring operational data in a continuous fashion. Monitoring and analysis can be performed in a periodic fashion. Periods can be overlapping or end-to-end to facilitate continuous monitoring, or monitoring can be performed in a continuous fashion such that times are associated with data points but no time segments are arbitrarily separated during data collection, instead relying on analysis (e.g., identifying dynamic periods of time during which conditions or patterns exist) to segment an ongoing undivided collection technique. At 304, an initial TCA data state is initialized. At 306, TCA values including the operational data are monitored and analyzed. After analysis, operational data can be added to stored historical data in a TCA database.

At 308, TCA patterns are identified for storage in a pattern bank. TCA patterns can include patterns of resource utilization. These patterns can be identified for one or more resources (e.g., compute, storage, network) during one or more static or dynamic periods of time. Periods may be arbitrary lengths of time (e.g., resource utilization during a 20-minute interval which occurs at different points on different days), time as identified by day and hour (e.g., the noon hour on the second Wednesday of the month), or other measures. In some situations, same or similar patterns may be identified over different time periods which may be of the same or different lengths. In embodiments, the pattern bank may preexist operation of methodology 300, one or more additional patterns may be discerned to supplement a pattern bank, or step 308 may be skipped. Patterns can be determined for various periods of time, such as, e.g., 1 hour, 2 hours, 4 hours, 8 hours, 24 hours, or any discrete amount there between, et cetera, based on, e.g., modeling TCA data as a normal distribution. The patterns can include patterns relating to SLA impacts, resource utilization, or other variables related to network traffic or operations. Patterns can be determined based on the normal distribution of resource utilization for a given period.

Periods on which patterns are discerned are successively analyzed to develop groups of neighboring patterns which can be described or stored as tree data structures. Individual patterns can be stored as a set including mean ($\mu$), standard deviation ($\sigma$), and threshold(s) (TT) for each set (e.g., P={$\mu$, $\sigma$, TT}). Thresholds may be identified as the normal range within the normal distribution. A normal range may be the mean plus or minus standard deviation, or another value. Individual patterns are stored, according to a tree data structure or in other manners, in a pattern bank. Where trees are used, a total period of monitoring or observation can be segmented into groups to establish branches and leaves as neighbors (e.g., pattern bank includes patterns {$P_1$, $P_i$ . . . $P_n$}). For example, a three-month monitoring period can be divided into 12 weeks, with each week divided into seven days. If patterns are identified at daily granularity, a total of 84 day patterns are stored in this particular tree, with 12 week patterns as parents. Higher (e.g., hourly) or lower (e.g., 48-hour) resolution, longer or shorter monitoring periods, or different segmentation will change the total number of patterns and neighbor arrangement accordingly.

An example for a tree in which different days of the week are neighbors is described for illustrative purposes. An example neighbor set of P(i,j) (or $P_{ij}$, where P(i,j) or $P_{i,j}$ is the pattern for j-th day of the i-th week), (the neighbor) called NP(i,j)={P(i+k,j+1), 1$\Leftarrow$i$\Leftarrow$M, 1$\Leftarrow$j$\Leftarrow$7} where, if (j+1)>7 (for seven days in a week), (j+1) can be re-set to 1. If the pattern bank contains 12 weeks, a neighbor set of P values for Day 2 of Week 3 is a set of P values for Day 3 of weeks 1, 2, and 4-12. In the manner discussed above, $P_{ij}$={$\mu_{ij}$, $\sigma_{ij}$, $TT_{ij}$} describes a pattern among the tree containing parents and children as weeks and days of the pattern bank's period.

Identified or stored patterns are used to help trigger adaptive TCA thresholding as described herein. In embodiments employing a tree structure, the tree can serve as a decision tree for purposes of predicting thresholds after adaptive thresholding is triggered. In embodiments, processing operational data can be performed in parallel or at a different time than processing historical data (with or without operational data) for purposes of pattern identification.

After monitoring data in view of known patterns, a determination can be made as to whether the adaptive TCA thresholding process will be triggered. This determination can take place in multiple steps or sub-steps. At 310, TCA(SLA) is computed. TCA(SLA) can be the SLA impact during the period (e.g., how many SLA impacts are acceptable in a given period). Once determined, a determination is made as to whether TCA(SLA) exceeds a design target (e.g., how many SLA impacts are acceptable in a period) associated with a current TCA threshold. Design targets for TCA(SLA) (and TCA(R), as described below) vary based on particular environments and agreements, and may be static or dynamic. For example, an agreement for services can include a SLA explaining qualitatively or quantitatively the level of service expected to comply with the agreement. The agreement language is realized through mathematically representing the parameters of the SLA as design targets, and providing hardware and/or software resources sufficient to observe those design targets. In various environments, design targets can be self-updating and/or iteratively modified to ensure that SLA requirements are observed (and/or resources are allocated in accordance with TCA(R)) in the context of a dynamic and changing loads and resources. If the determination at 312 returns in the negative, service is not impacted based on the current thresholding, the TCA is operating within the desired parameters, and no adaptive thresholding is required. Accordingly, methodology 300 proceeds to 322 where a determination is made as to whether the process has concluded. If it has not, methodology 300 returns to 306 where TCA values are monitored as described. If the process has concluded, methodology 300 proceeds to 324 where a new solution may be implemented (if calculated through previous iterations) and thereafter methodology 300 ends at 326.

If TCA(SLA) does exceed the design target, this means service is impacted based on current thresholding, and methodology 300 instead proceeds to 314 where TCA(R) is computed. TCA(R) can be resource utilization during the period. TCA(R) represents resource utilization which can include, e.g., compute, storage, network or bandwidth, et cetera. After computing TCA(R), this value is compared to the TCA(R) design target associated with a current TCA threshold. If the TCA(R) value is below the design target, SLA is impacted but the problem is not owing to the current TCA threshold values. Accordingly, in such circumstance, methodology 300 recycles to 306 and continues monitoring TCA values. Alternatively or complementarily, other action can be taken when TCA(SLA) exceeds its design target but TCA(R) is below its design target (e.g., send a notification to an administrator, interrogate customer devices for compatibility or performance issues).

However, if TCA(R) exceeds the design parameters associated with current thresholding, methodology 300 proceeds to 318 where pattern matching is conducted to find a pattern fitting current operational data. Pattern matching can be performed by various techniques. The pattern will provide modified thresholding values to reduce SLA impact. These thresholds can be used for capacity planning, and in embodiments may be used for actual implementation of capacity adjustments or plans whereby dynamic network resources are scaled-up or scaled-down based on newly computed thresholds. In embodiments, adaptively calculated thresholds can be used for network or resource modeling and testing.

In embodiments, a heuristic-based pattern matching technique can be used to match operational data to patterns from the pattern bank. Heuristics can include a similarity check. The similarity check can include mean matching where an observed mean is closest to the mean from another pattern in the pattern bank based on a minimum distance criteria. Heuristics can also include a normal behavior range check. The standard deviation check can check a standard deviation to determine whether a standard deviation data point is closest to a matched pattern (e.g., by mean matching) in comparison to other patterns in the pattern bank.

Figure 4:
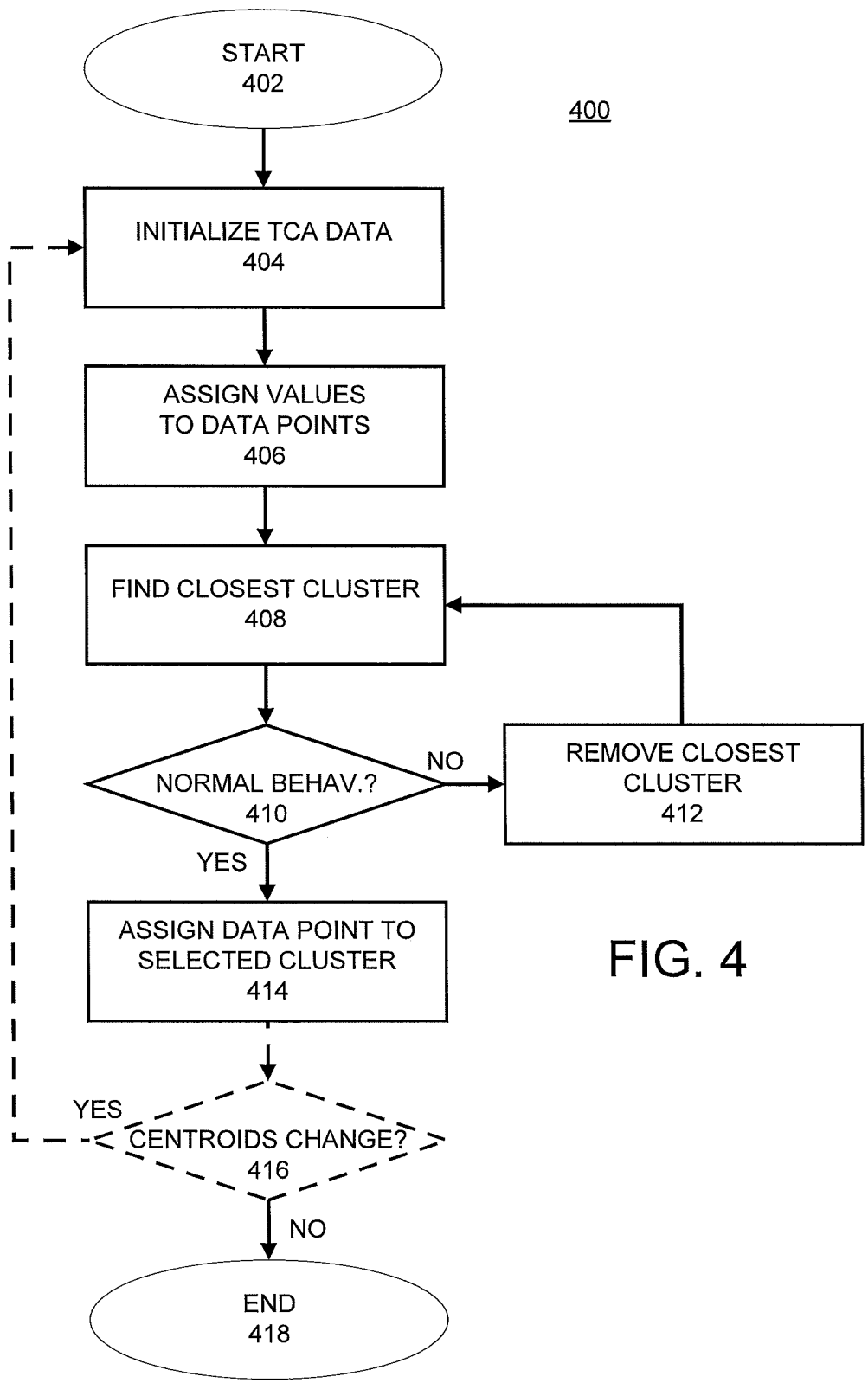
FIG. 4 illustrates an example method flow for pattern matching disclosed herein.

In alternative or complementary embodiments, machine learning based pattern matching technique can be used to match operational data to patterns from the pattern bank. An example of machine learning based matching can include k-mean clustering. An example of such techniques is illustrated in FIG. 4, but others can be used without departing from the scope and sprit of the innovation.

Figure 5:
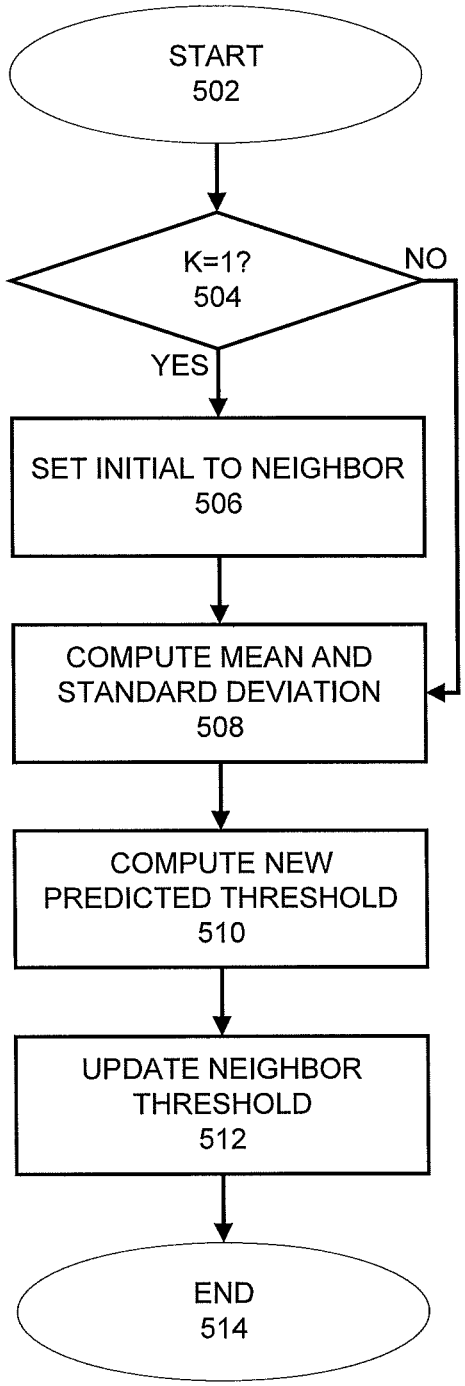
FIG. 5 illustrates an example method flow for predicting thresholds disclosed herein.

Based on the matched pattern, thresholds reducing SLA impact can be predicted at 320. In embodiments, the prediction is based on one or more neighbor thresholds associated with the matched pattern. An example of such techniques is illustrated in FIG. 5, but others can be used without departing from the scope and sprit of the innovation.

After predicting a new threshold, methodology 300 can proceed to 310 where TCA(SLA) is calculated based on the new, predicted threshold, and SLA impact can be calculated in view of the TCA values to ascertain whether the new threshold resolves SLA issues or if further computation is required. Aspects 310 through 320 can be repeated as needed until the determination at 312 returns negative. In alternative or complementary embodiments where multiple cycles are required, methodology 300 may at times recycle to 302 or other steps to "refresh" data being considered in threshold prediction. Thresholds (or other parameters) associated with predicted thresholds can be implemented immediately or can relate to corrections in subsequent periods.

While methodology 300 provides a variety of aspects for purposes of explanation, it is understood that certain elements may be excluded without departing from the scope or spirit of the innovation. For example, a preexisting pattern bank can be utilized and an alternative methodology could thus exclude aspects relating to identifying TCA patterns at 308. In still other embodiments, aspects not expressly shown in methodology 300 can be utilized without departing from the scope or spirit of the innovation. For example, after 320, an aspect for controlling or causing implementation of a predicted threshold can be used with methodology 300 to command or update network orchestration to use the predicted threshold.

FIG. 4 illustrates a methodology 400 for performing a k-mean clustering based pattern matching technique, which can be utilized in a non-limiting manner with some embodiments of methodology 300. Methodology 400 can be implemented at, e.g., 318 of methodology 300 or in conjunction with other aspects, or separately from methodology 300. A TCA pattern matcher may use a k-mean clustering algorithm, a machine learning technique, to classify new data to one of K clusters obtained from a TCA pattern bank or identified by a TCA pattern identifier. This matching is performed to match new operations data to historical data in the cluster having a similar characteristics based on a minimum distance criterion.

Methodology 400 begins at 402 and proceeds to 404 where TCA data is initialized. Initializing can involve identifying details of operation data to be matched (e.g., model new operations data of resource utilization over 24-hour period as a normal distribution, and compute its μ and σ to determine a new operational data pattern, (μ−σ, μ+σ)). Additional data used for k-mean clustering can include (but is not limited to) a number of patterns in the given pattern bank (K) and the data point of the current operational data (P=(μ,σ)).

At 406, data points are assigned values. K points are selected with the initial centroid of cluster i ($C_i$) assigned to be mean ($\mu_i$) of cluster i (pattern i) from a pattern bank. This can be repeated as necessary.

A similarity check can be performed among K clusters by assigning each new data point from the operational data to its closest centroid based on the minimum distance criterion. The distance of two data points (e.g., $p_i$ and $q_i$) can be determined using a Euclidean metric.

$$d = \sqrt{\sum_{i=1}^{k} (p_i - q_i)^2}$$

Based on this distance, at 408, a closest cluster is located.

At 410, a determination is made as to normal behavior of the closest cluster. This determines whether the operational standard deviation is closest to the matched pattern standard deviation in the pattern bank and that the standard deviation of the matched pattern is less than that of the operational data. If it is not, the matched (i-th) cluster is removed from the pattern bank (or remaining subset thereof) at 412, and methodology 400 recycles to 408. If the normal behavior range check at 410 returns positive, methodology 400 proceeds to 414.

At 414, a data point is assigned to the selected cluster. The centroids of each cluster are re-computed, and data points re-assigned to repeat methodology 400 until the centroids do not change. In embodiments, this can be tested at 416. At 418, methodology 400 ends. While FIG. 4 illustrates one technique for matching patterns, it is discussed for example purposes only, and alternatives may be employed with other aspects herein without departing from the scope or spirit of the innovation.

FIG. 5 illustrates a methodology 500 for predicting a threshold based on a matched pattern, which can be utilized in a non-limiting manner with some embodiments of methodology 300. Methodology 500 can be implemented at, e.g., 320 of methodology 300 or in conjunction with other aspects, or separately from methodology 300. A TCA threshold predictor is configured to predict a "likely" TCA threshold from a set of neighbor thresholds (which can be described as NT={$Y_1, \ldots, Y_i, \ldots Y_n$} where $Y_i$ is the i-th neighbor pattern of pattern P which matches new daily operations data pattern) of the pattern (P) in the pattern being matched. The new TCA threshold prediction value can be the mean and standard deviation of the neighbor set (NT).

Methodology 500 begins at 502, after a pattern matching the operational data has been found, and proceeds to 504 where a determination is made as to whether the methodology is in its first iteration (e.g., counter K is equal to one, where K is the execution iteration such as the day number among the number of operations days). If so, at 506, the initial candidate threshold list (NT) is set to be the neighbor threshold list ({$Y_1, \ldots, Y_i, \ldots Y_n$}).

Thereafter, or if the determination at 504 returns negative, a mean and standard deviation are calculated from NT at 508. This can be calculated according to the following equation:

$$\sigma = \sqrt{\frac{\sum (Y_n - M)^2}{N - 1}}$$

where N=number of dataset {$Y_i$} of the selected pattern (P), and M=μ (mean of dataset {$Y_i$}).

At 510 a new predicted threshold is computed based on the mean and standard deviation (Y=μ+σ)). At 512 the NT set can be updated by adding the newly-computed threshold (Y) to the current NT set. This alternatively threshold may be tested thereafter. Once the threshold is adaptively updated, methodology 500 ends at 514. While FIG. 5 illustrates one technique for predicting thresholds, it is discussed for example purposes only, and alternatives may be employed with other aspects herein without departing from the scope or spirit of the innovation.

Figure 6:
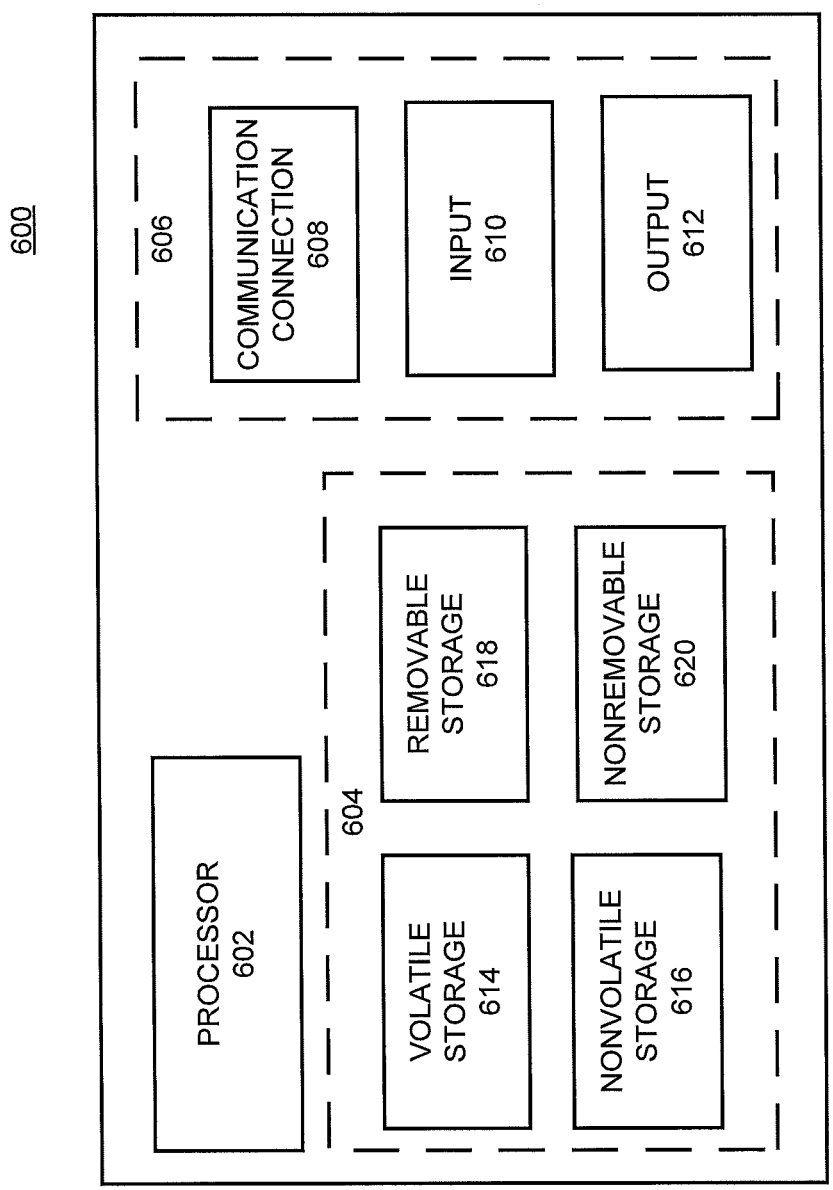
FIG. 6 illustrates a schematic of an example network device.
Figure 7:
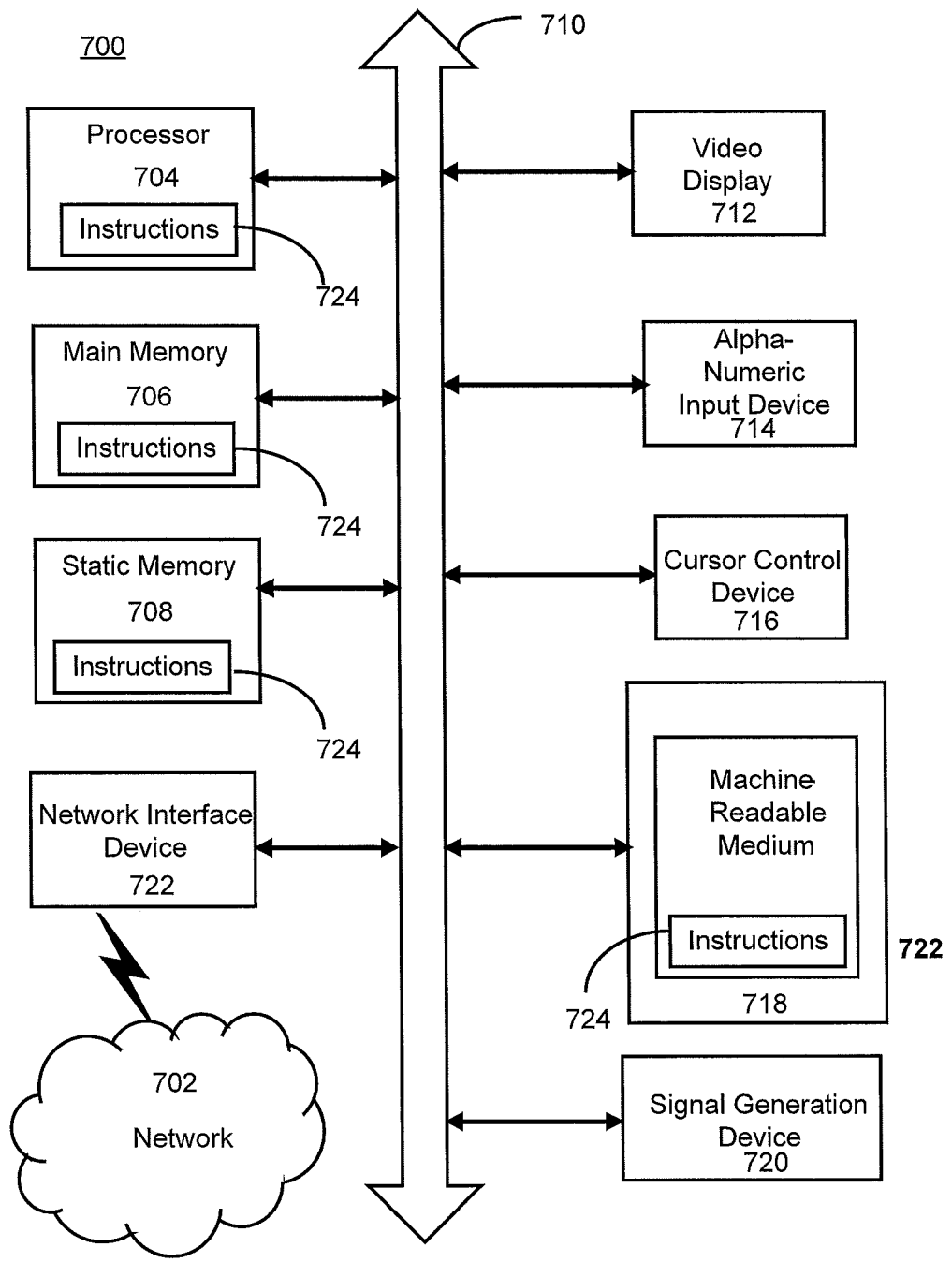
FIG. 7 illustrates an example communication system that provides wireless telecommunication services over wireless communication networks.

FIG. 6 is a block diagram of network device 600 that may be connected to or include a component of physical network 600. Network device 600 may include hardware or a combination of hardware and software. The functionality to facilitate telecommunications via a telecommunications network may reside in one or combination of network devices 600. Network device 600 depicted in FIG. 6 may represent or perform functionality of an appropriate network device 600, or combination of network devices 600, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 7 is example and not intended to imply a limitation to a specific implementation or configuration. Thus, network device 600 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 600 may include a processor 602 and a memory 604 coupled to processor 602. Memory 604 may contain executable instructions that, when executed by processor 602, cause processor 602 to effectuate operations associated with mapping wireless signal strength. As evident from the description herein, network device 600 is not to be construed as software per se.

In addition to processor 602 and memory 604, network device 600 may include an input/output system 606. Processor 602, memory 604, and input/output system 606 may be coupled together to allow communications between them. Each portion of network device 600 may include circuitry for performing functions associated with each respective portion. Thus, each portion may include hardware, or a combination of hardware and software. Accordingly, each portion of network device 600 is not to be construed as software per se. Input/output system 606 may be capable of receiving or providing information from or to a communications device or other network entities configured for telecommunications. For example input/output system 606 may include a wireless communications (e.g., 3G/4G/GPS) card. Input/output system 606 may be capable of receiving or sending video information, audio information, control information, image information, data, or any combination thereof. Input/output system 606 may be capable of transferring information with network device 600. In various configurations, input/output system 606 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 606 may include a Wi-Fi finder, a two-way GPS chipset or equivalent, or the like, or a combination thereof.

Input/output system 606 of network device 600 also may contain a communication connection 608 that allows network device 600 to communicate with other devices, network entities, or the like. Communication connection 608 may include communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 606 also may include an input device 610 such as keyboard, mouse, pen, voice input device, or touch input device. Input/output system 606 may also include an output device 612, such as a display, speakers, or a printer.

Processor 602 may be capable of performing functions associated with telecommunications, such as functions for processing broadcast messages, as described herein. For example, processor 602 may be capable of, in conjunction with any other portion of network device 600, determining a type of broadcast message and acting according to the broadcast message type or content, as described herein.

Memory 604 of network device 600 may include a storage medium having a concrete, tangible, physical structure. As is known, a signal does not have a concrete, tangible, physical structure. Memory 604, as well as any computer-readable storage medium described herein, is not to be construed as a signal. Memory 604, as well as any computer-readable storage medium described herein, is not to be construed as a transient signal. Memory 604, as well as any computer-readable storage medium described herein, is not to be construed as a propagating signal. Memory 604, as well as any computer-readable storage medium described herein, is to be construed as an article of manufacture.

Memory 604 may store any information utilized in conjunction with telecommunications. Depending upon the exact configuration or type of processor, memory 604 may include a volatile storage 614 (such as some types of RAM), a nonvolatile storage 616 (such as ROM, flash memory), or a combination thereof. Memory 604 may include additional storage (e.g., a removable storage 618 or a non-removable storage 620) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 600. Memory 604 may include executable instructions that, when executed by processor 602, cause processor 602 to effectuate operations to map signal strengths in an area of interest.

FIG. 7 depicts an example diagrammatic representation of a machine in the form of a computer system 700 within which a set of instructions, when executed, may cause the machine to perform any one or more of the methods described above. One or more instances of the machine can operate, for example, as processor 602, hardware platform 606, and other devices mentioned herein. In some embodiments, the machine may be connected (e.g., using a network 702) to other machines. In a networked deployment, the machine may operate in the capacity of a server or a client user machine in a server-client user network environment, or as a peer machine in a peer-to-peer (or distributed) network environment.

The machine may include a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 700 may include a processor (or controller) 704 (e.g., a central processing unit (CPU)), a graphics processing unit (GPU, or both), a main memory 706 and a static memory 708, which communicate with each other via a bus 710. The computer system 700 may further include a display unit 712 (e.g., a liquid crystal display (LCD), a flat panel, or a solid state display). Computer system 700 may include an input device 714 (e.g., a keyboard), a cursor control device 716 (e.g., a mouse), a disk drive unit 718, a signal generation device 720 (e.g., a speaker or remote control) and a network interface device 722. In distributed environments, the embodiments described in the subject disclosure can be adapted to utilize multiple display units 712 controlled by two or more computer systems 700. In this configuration, presentations described by the subject disclosure may in part be shown in a first of display units 712, while the remaining portion is presented in a second of display units 712.

The disk drive unit 718 may include a tangible computer-readable storage medium 724 on which is stored one or more sets of instructions (e.g., software 726) embodying any one or more of the methods or functions described herein, including those methods illustrated above. Instructions 726 may also reside, completely or at least partially, within main memory 706, static memory 708, or within processor 704 during execution thereof by the computer system 700. Main memory 706 and processor 704 also may constitute tangible computer-readable storage media.

Figure 8A:
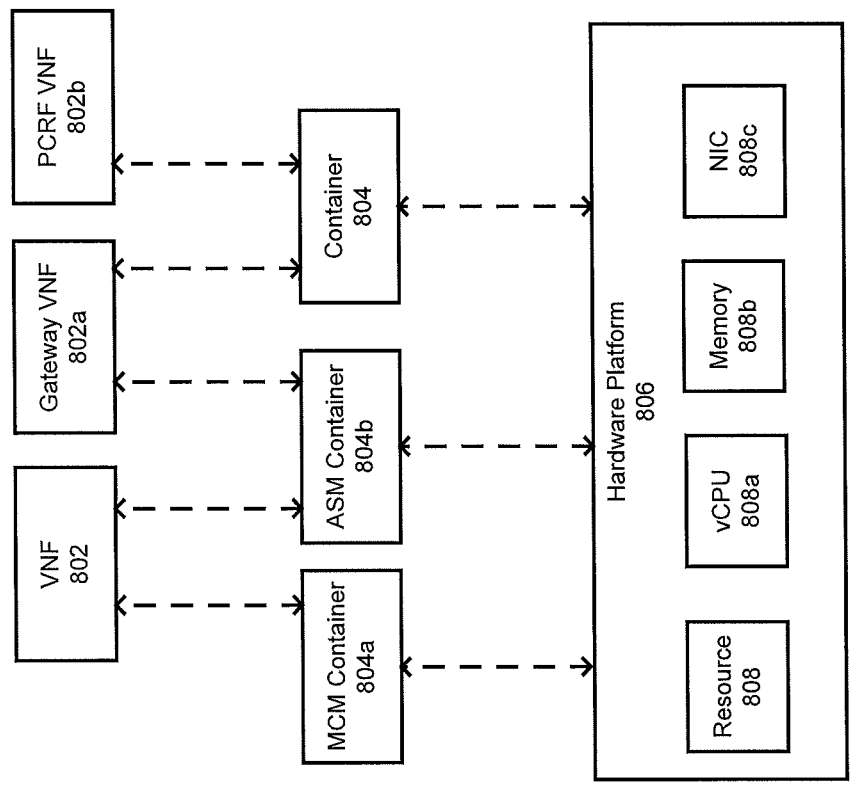
FIG. 8A is a representation of an example network.

FIG. 8A is a representation of an example network 800. Network 800 may include an SDN—that is, network 800 may include one or more virtualized functions implemented on general purpose hardware, such as in lieu of having dedicated hardware for every network function. That is, general purpose hardware of network 800 may be configured to run virtual network elements to support communication services, such as mobility services, including consumer services and enterprise services. These services may be provided or measured in sessions.

A virtual network functions (VNFs) 802 may be able to support a limited number of sessions. Each VNF 802 may have a VNF type that indicates its functionality or role. For example, FIG. 8A illustrates a gateway VNF 802*a* and a policy and charging rules function (PCRF) VNF 802*b*. Additionally or alternatively, VNFs 802 may include other types of VNFs. Each VNF 802 may use one or more containers 804 to operate. Each Container 804 may have a Container type that indicates its functionality or role. For example, FIG. 8A illustrates a MCM Container 804*a*, an ASM Container 804*b*, and a DEP Container 804*c*. Additionally or alternatively, Containers 804 may include other types of Containers. Each Container 804 may consume various network resources from a hardware platform 806, such as a resource 808, a virtual central processing unit (vCPU) 808*a*, memory 808*b*, or a network interface card (NIC) 808*c*. Additionally or alternatively, hardware platform 806 may include other types of resources 808.

Figure 8B:
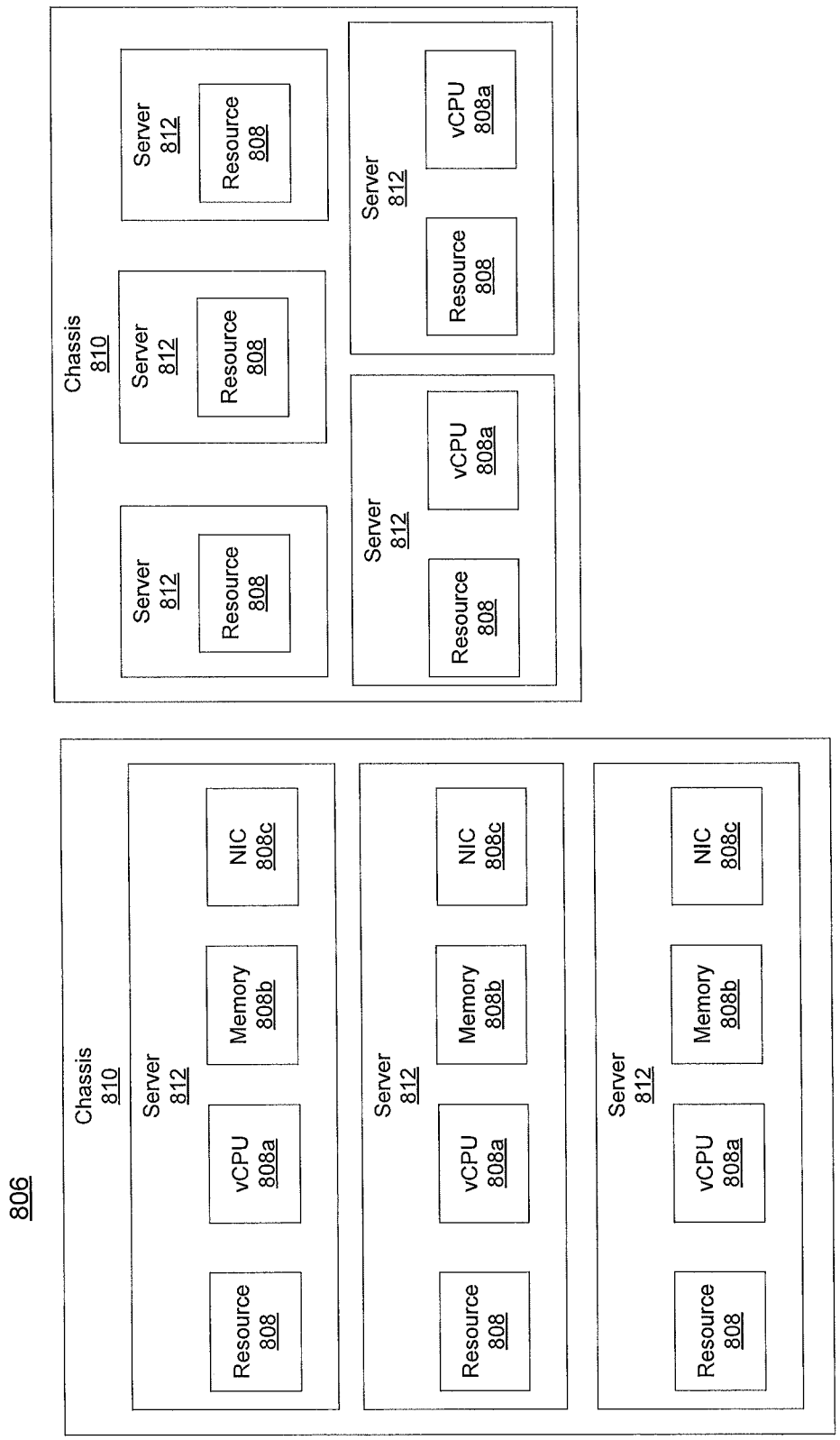
FIG. 8B is a representation of an example hardware platform for a network.

While FIG. 8A illustrates resources 808 as collectively contained in hardware platform 806, the configuration of hardware platform 806 may isolate, for example, certain memory 808*c* from other memory 808*c*. FIG. 8B provides an example implementation of hardware platform 806.

Hardware platform 806 may include one or more chasses 810. Chassis 810 may refer to the physical housing or platform for multiple servers or other network equipment. In an aspect, chassis 810 may also refer to the underlying network equipment. Chassis 810 may include one or more servers 812. Server 812 may include general purpose computer hardware or a computer. In an aspect, chassis 810 may include a metal rack, and servers 812 of chassis 810 may include blade servers that are physically mounted in or on chassis 810.

Each server 812 may include one or more network resources 808, as illustrated. Servers 812 may be communicatively coupled together (not shown) in any combination or arrangement. For example, all servers 812 within a given chassis 810 may be communicatively coupled. As another example, servers 812 in different chasses 810 may be communicatively coupled. Additionally or alternatively, chasses 810 may be communicatively coupled together (not shown) in any combination or arrangement.

The characteristics of each chassis 810 and each server 812 may differ. For example, FIG. 8B illustrates that the number of servers 812 within two chasses 810 may vary. Additionally or alternatively, the type or number of resources 810 within each server 812 may vary. In an aspect, chassis 810 may be used to group servers 812 with the same resource characteristics. In another aspect, servers 812 within the same chassis 810 may have different resource characteristics.

Given hardware platform 806, the number of sessions that May be instantiated may vary depending upon how efficiently resources 808 are assigned to different containers 804. For example, assignment of Containers 804 to particular resources 808 may be constrained by one or more rules. For example, a first rule may require that resources 808 assigned to a particular Container 804 be on the same server 812 or set of servers 812. For example, if Container 804 uses eight vCPUs 808*a*, 1 GB of memory 808*b*, and 2 NICs 808*c*, the rules may require that all of these resources 808 be sourced from the same server 812. Additionally or alternatively, Container 804 may require splitting resources 808 among multiple servers 812, but such splitting may need to conform to certain restrictions. For example, resources 808 for Containers 804 may be able to be split between two servers 812. Default rules may apply. For example, a default rule may require that all resources 808 for a given Container 804 must come from the same server 812.

An affinity rule may restrict assignment of resources 808 for a particular Container 804 (or a particular type of container 804). For example, an affinity rule may require that certain Containers 804 be instantiated on (that is, consume resources from) the same server 812 or chassis 810. For example, if VNF 802 uses six MCM Containers 804*a*, an affinity rule may dictate that those six MCM Containers 804*a* may be instantiated on the same server 812 (or chassis 810). As another example, if VNF 802 uses MCM Containers 804*a*, ASM Containers 804*b*, and a third type of Containers 804, an affinity rule may dictate that at least the MCM Containers 804*a* and the ASM Containers 804*b* be instantiated on the same server 812 (or chassis 810). Affinity rules may restrict assignment of resources 808 based on the identity or type of resource 808, VNF 802, Container 804, chassis 810, server 812, or any combination thereof.

An anti-affinity rule may restrict assignment of resources 808 for a particular Container 804 (or a particular type of Container 804). In contrast to an affinity rule which may require that certain Containers 804 be instantiated on the same server 812 or chassis 810 an anti-affinity rule requires that certain Containers 804 be instantiated on different servers 812 (or different chasses 810). For example, an anti-affinity rule may require that MCM Container 804*a* be instantiated on a particular server 812 that does not contain any ASM Containers 804*b*. As another example, an anti-affinity rule may require that MCM Containers 804*a* for a first VNF 802 be instantiated on a different server 812 (or chassis 810) than MCM containers 804*a* for a second VNF 802. Anti-affinity rules may restrict assignment of resources 808 based on the identity or type of resource 808, VNF 802, Container 804, chassis 810, server 812, or any combination thereof.

Within these constraints, resources 808 of hardware platform 806 may be assigned to be used to instantiate Containers 804, which in turn may be used to instantiate VNFs 802, which in turn may be used to establish sessions. The different combinations for how such resources 808 may be assigned may vary in complexity and efficiency. For example, different assignments may have different limits of the number of sessions that can be established given a particular hardware platform 806.

For example, consider a session that may require gateway VNF 802*a* and PCRF VNF 802*b*. Gateway VNF 802*a* may require five Containers 804 instantiated on the same server 812, and PCRF VNF 802*b* may require two Containers 804 instantiated on the same server 812. (For this example, assume that no affinity or anti-affinity rules restrict whether Containers 804 for PCRF VNF 802*b* may or must be instantiated on the same or different server 812 than Containers 804 for gateway VNF 802*a*.) In this example, each of two servers 812 may have sufficient resources 808 to support 10 Containers 804. To implement sessions using these two servers 812, first server 812 may be instantiated with 10 Containers 804 to support two instantiations of gateway VNF 802*a*, and second server 812 may be instantiated with 9 Containers: five containers 804 to support one instantiation of gateway VNF 802*a* and four Containers 804 to support two instantiations of PCRF VNF 802*b*. This may leave the remaining resources 808 that could have supported the tenth Container 804 on second server 812 unused (and unusable for an instantiation of either a gateway VNF 802*a* or a PCRF VNF 802*b*). Alternatively, first server 812 may be instantiated with 10 Containers 804 for two instantiations of gateway VNF 802*a* and second server 812 may be instantiated with 10 Containers 804 for five instantiations of PCRF VNF 802*b*, using all available resources 808 to maximize the number of Containers 804 instantiated.

Consider, further, how many sessions each gateway VNF 802*a* and each PCRF VNF 802*b* may support. This may factor into which assignment of resources 808 is more efficient. For example, consider if each gateway VNF 802*a* supports, e.g., two million sessions, and if each PCRF VNF 802*b* supports, e.g., three million sessions. For the first configuration—three total gateway VNFs 802*a* (which can satisfy a gateway requirement for, e.g., six million sessions) and two total PCRF VNFs 802*b* (which satisfy a PCRF requirement for, e.g., six million sessions)—would support a total of, e.g., six million sessions. For the second configuration—two total gateway VNFs 802*a* (which satisfy a gateway requirement for, e.g., four million sessions) and five total PCRF VNFs 802*b* (which satisfy a PCRF requirement for, e.g., 15 million sessions)—support a total of, e.g., four million sessions. Thus, while the first configuration may seem less efficient looking only at the number of available resources 808 used (as resources 808 for the tenth possible Container 804 are unused), the second configuration is actually more efficient from the perspective of being the configuration that can support more the greater number of sessions.

To solve the problem of determining a capacity (or, number of sessions) that can be supported by a given hardware platform 805, a given requirement for VNFs 802 to support a session, a capacity for the number of sessions each VNF 802 (e.g., of a certain type) can support, a given requirement for Containers 804 for each VNF 802 (e.g., of a certain type), a given requirement for resources 808 to support each Container 804 (e.g., of a certain type), rules dictating the assignment of resources 808 to one or more Containers 804 (e.g., affinity and anti-affinity rules), the chasses 810 and servers 812 of hardware platform 806, and the individual resources 808 of each chassis 810 or server 812 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

Containers may "look like" VMs. For example, containers may have private space for processing, may execute commands as root, may have a private network interface and IP address, may allow custom routes and iptable rules, or may mount file systems, among other things. A difference between containers and VMs is that containers may share the host system's kernel with other containers.

While examples of a telecommunications system in which alerts can be processed and managed for auto-scaling and updates have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein. It is contemplated herein that there may be some overlap of components herein which are logical. Logical components, such as shown in FIG. 1 and FIG. 2, may be held on one physical (or virtual) device or appropriately distributed, as disclosed herein.

This written description uses examples to enable any person skilled in the art to practice the claimed invention, including making and using any devices or systems and performing any incorporated methods. The patentable scope of the invention is defined by the claims, and may include other examples that occur to those skilled in the art (e.g., skipping steps, combining steps, or adding steps between example methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. A method, comprising:
   receiving, by a processing system including a processor, threshold crossing alert (TCA) data relating to a service level agreement (SLA) and including operational TCA data;
   determining, by the processing system, that a threshold not being satisfied, the threshold associated with the TCA, is associated with a root cause of an SLA impact;
   triggering, by the processing system, a dynamic prediction of a new TCA trigger resulting in a TCA prediction trigger based on the TCA and the determining step;
   matching, by the processing system, in response to determining, by the processing system, the TCA prediction trigger, the operational TCA data to a pattern of a plurality of patterns from a TCA pattern bank, wherein the determining, by the processing system, of the TCA prediction trigger includes determining, by the processing system, from the TCA data, the service level agreement (SLA) impacts exceed a target SLA impact count associated with a current threshold and determining, by the processing system, from the TCA data, that resource utilization exceeds a resource target utilization with the current threshold;
   storing, by the processing system, the plurality of patterns according to a tree data structure in the TCA pattern bank;
   using, by the processing system, the tree data structure to segment a total period of monitoring into a plurality of sets to establish branches and leaves as neighbors; and
   calculating, by the processing system, a predicted TCA threshold based on the pattern from the TCA pattern bank, wherein the TCA pattern bank comprises the plurality of sets.

2. The method of claim 1, wherein the receiving of the TCA data includes retrieving, by the processing system, the TCA data from a TCA database, wherein the TCA data is historical TCA data.

3. The method of claim 1, wherein the operational TCA data is monitored in a continuous manner.

4. The method of claim 3, further comprising:
   storing, by the processing system, the TCA data in a TCA database.

5. The method of claim 1, wherein the TCA data includes one or more of service level agreement (SLA) TCA data and resource utilization TCA data.

6. The method of claim 1, further comprising:
   identifying, by the processing system, one or more patterns in the TCA data.

7. The method of claim 6, wherein the TCA prediction trigger causes an adaptive thresholding process to be engaged.

8. The method of claim 1, wherein the calculating of the predicted TCA threshold based on the pattern from the TCA pattern bank includes calculating, by the processing system, the predicted TCA threshold based on a set of neighbor thresholds associated with the pattern.

9. The method of claim 1, wherein the matching of the operational TCA data to the pattern from the TCA pattern bank includes matching, by the processing system, based on a heuristic.

10. The method of claim 9, wherein the heuristic includes a similarity check and a behavior range check.

11. The method of claim 1, wherein the matching of the operational TCA data to the pattern from the TCA pattern bank includes matching, by the processing system, based on machine learning.

12. The method of claim 11, wherein the machine learning includes k-means clustering.

13. The method of claim 1, further comprising:
   implementing, by the processing system, the predicted TCA threshold.

14. A system, the system comprising:
   a processing system including a processor;
   memory coupled with the processing system, the memory comprising executable instructions that when executed by the processing system cause the processing system to effectuate operations comprising:
   receiving threshold crossing alert (TCA) data relating to a service level agreement (SLA) and including operational TCA data;
   determining that a threshold not being satisfied, the threshold associated with the TCA, is associated with a root cause of an SLA impact;
   triggering a dynamic prediction of a new TCA trigger resulting in a TCA prediction trigger based on the TCA and the determining step;
   matching, in response to determining the TCA prediction trigger, the operational TCA data to a pattern of a plurality of patterns from a TCA pattern bank, wherein the determining of the TCA prediction trigger includes determining, from the TCA data, the service level agreement (SLA) impacts exceed a target SLA impact count associated with a current threshold and determining, from the TCA data, that resource utilization exceeds a resource target utilization with the current threshold;
   storing the plurality of patterns according to a tree data structure in the TCA pattern bank;
   using the tree data structure to segment a total period of monitoring into a plurality of sets to establish branches and leaves as neighbors; and
   calculating a predicted TCA threshold based on the pattern from the TCA pattern bank, wherein the TCA pattern bank comprises the plurality of sets.

15. The system of claim 14, wherein the TCA data includes one or more of service level agreement (SLA) TCA data and resource utilization TCA data.

16. The system of claim 14, wherein the TCA prediction trigger causes an adaptive thresholding process to be engaged.

17. The system of claim 14, wherein the matching of the operational TCA data to the pattern from the TCA pattern bank includes matching based on a heuristic.

18. A non-transitory computer-readable medium, the non-transitory computer-readable medium storing instructions that when executed a processor perform aspects comprising:
receiving threshold crossing alert (TCA) data relating to a service level agreement (SLA) and including operational TCA data;
determining that a threshold not being satisfied, the threshold associated with the TCA, is associated with a root cause of an SLA impact;
triggering a dynamic prediction of a new TCA trigger resulting in a TCA prediction trigger based on the TCA and the determining step;
matching, in response to determining the TCA prediction trigger, the operational TCA data to a pattern of a plurality of patterns from a TCA pattern bank, wherein the determining of the TCA prediction trigger includes determining, from the TCA data, the service level agreement (SLA) impacts exceed a target SLA impact count associated with a current threshold and determining, from the TCA data, that resource utilization exceeds a resource target utilization with the current threshold;
storing the plurality of patterns according to a tree data structure in the TCA pattern bank;
using the tree data structure to segment a total period of monitoring into a plurality of sets to establish branches and leaves as neighbors; and
calculating a predicted TCA threshold based on the pattern from the TCA pattern bank, wherein the TCA pattern bank comprises the plurality of sets.

19. The non-transitory computer-readable medium of claim 18, wherein receiving TCA data includes retrieving the TCA data from a TCA database, wherein the TCA data is historical TCA data.

20. The non-transitory computer-readable medium of claim 18, wherein the operational TCA data is monitored in a continuous manner.

* * * * *